Sept. 20, 1971    J. B. DELPHIA, JR    3,606,328
VEHICLE DRAG RACING SIMULATOR ASSEMBLY
Filed Jan. 2, 1970
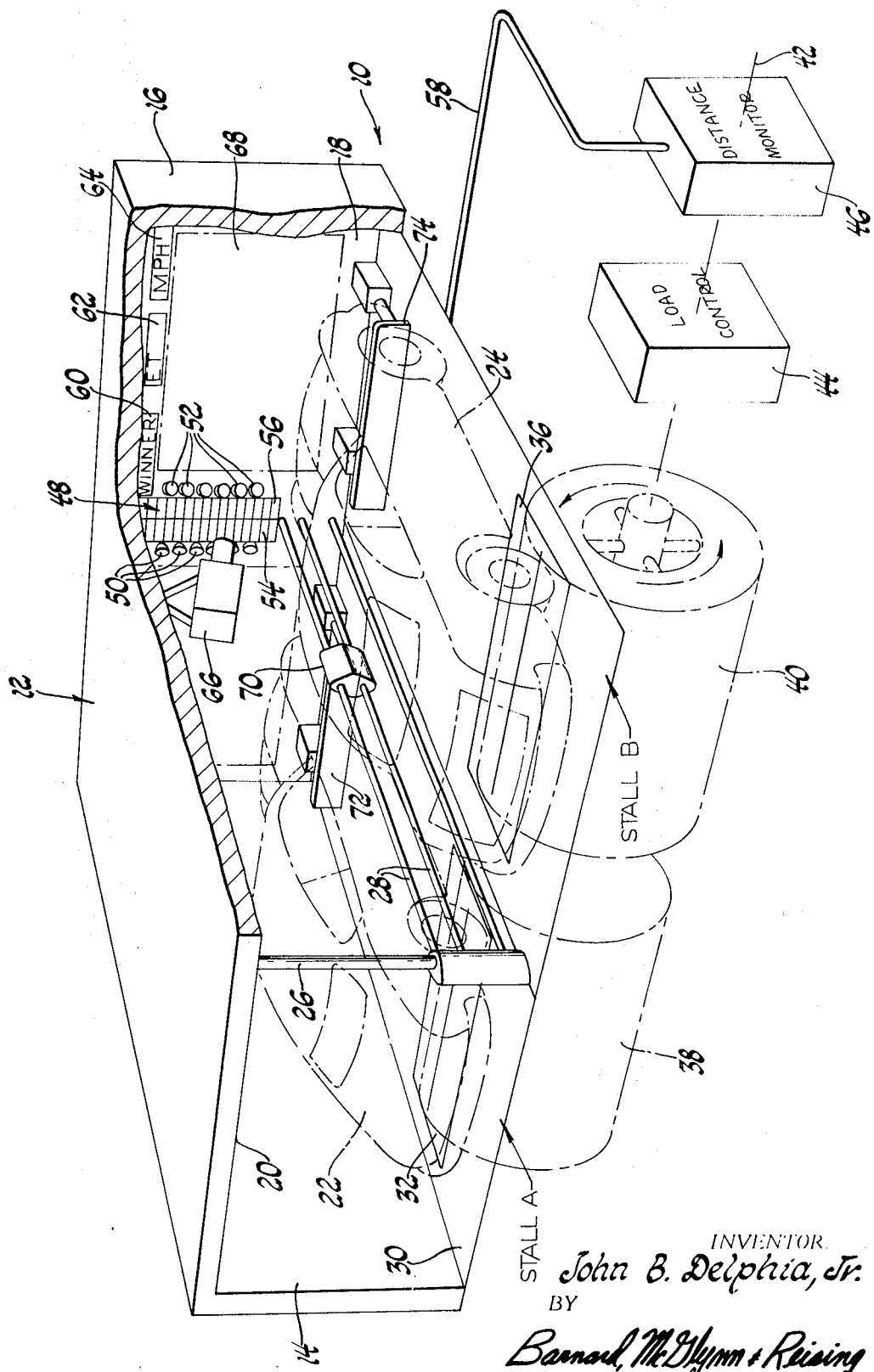
INVENTOR.
John B. Delphia, Jr.
BY
Barnard, McGlynn & Reising
ATTORNEYS

United States Patent Office 3,606,328
Patented Sept. 20, 1971

3,606,328
VEHICLE DRAG RACING SIMULATOR ASSEMBLY
John B. Delphia, Jr., 2052 Portlock,
Union Lake, Mich. 48085
Filed Jan. 2, 1970, Ser. No. 143
Int. Cl. A63g *33/00;* F16h *37/00;* G07f *1/00*
U.S. Cl. 273—86R                              18 Claims

ABSTRACT OF THE DISCLOSURE

A drag race simulator assembly including a building enclosing two racing stalls, dynamometer type traction rolls in each stall and signal lights including stagging lights and progress lights and other indicators for simulating racing conditions. The assembly is coin operated.

---

This invention relates to apparatus for realistically simulating racing conditions for automobiles using dynanometer type equipment rather than an open roadway.

The sport of "drag racing" is currently very popular and is practiced in various ways ranging from spontaneous races on open roads to highly organized and competitive events taking place at special grounds, commonly called "strips." A drag race is essentially a race between two or more vehicles to determine which can accelerate over a predetermined course or reach a predetermined speed in the least time. While such races can, through the use of the proper equipment, be run against a clock one vehicle at a time, it is more often the case that two or more vehicles race at the same time thus to produce the impression that the two vehicles are racing against one another.

The present invention makes it possible for a vehicle or vehicles to participate in a simulated race carried on within what may be a relatively small enclosing structure but responding to the actual accelerating capabilities of the vehicle or vehicles involved. In general, this is accomplished through the use of rotatable dynamometric type traction means such as rollers engageable with the drive wheels of a vehicle and disposed within an enclosing structure, such as a small building, together with indicator means operatively connected with the traction means through suitable devices for signaling the beginning and ending of a simulated race. The present invention lends itself particularly well to coin operated installations which may be established for revenue producing purposes, either with or without a supervising attendant.

In a preferred form, the subject invention comprises a structure defining two laterally adjacent parallel stalls for vehicles and dynamometric type traction means in each stall and engageable with the rear wheels of the vehicles. The stalls may be constructed such that the traction means appear through an opening in the floor such that the vehicles may be driven directly into the stalls and positioned with their rear wheels on the traction means. The indicator means associated with each vehicle simultaneously start the race for each vehicle by progressively actuated indicators commonly called "staging lights." Moreover, the indicator means may include for each vehicle an arrangement of lights to signal the progress of the vehicles to their operators and to indicate the relative standing of the two vehicles during the race. Finally, the indicator means may include means to indicate the winner of the race and to present such other statistical information as may be of value to the vehicle operators. The preferred form of the invention may also be coin operated or attendant operated and may be set up in such a way as to permit both multi-vehicle and single vehicle racing.

Various embellishments may be employed in the structure embodying the invention such as projectors and screens for causing an image of a racing scene to appear in front of the vehicle thereby to increase the feeling of race participation by the vehicle operators. Various other features and advantages and details of the invention may be made more apparent by reading the following specification which describes the illustrative embodiments of the invention shown in the accompanying single figure drawing.

Referring to the drawing, an illustrative race simulation assembly 10 comprises an enclosing structure 12 having laterally spaced side walls 14 and 16, a forward wall 18 and a ceiling 20, all of which are preferably made of or lined with an acoustical material which absorbs noise efficiently. The enclosing structure 12 defines two laterally adjacent parallel stalls A and B for receiving vehicles 22 and 24 longitudinally therein and facing the end wall 18. The two stalls A and B may be separated by means of one or more vertical posts 26 and a plurality of parallel longitudinally extending horizontal guard rails 28.

The enclosing structure 12 further includes a flat floor 30 defining a vehicular support surface having laterally spaced openings 32 and 36 toward the rear or entrance end of the stalls A and B, respectively. Disposed beneath and extending into the openings 32 and 36 are dynamometric rollers 38 and 40 having a common laterally extending axis of rotation 42 and being disposed relative to the opening such that the roller surfaces may be directly engaged by the rear or drive wheels of the vehicles 22 and 24. Rollers 38 and 40 are preferably covered with a durable traction producing material so as to approximate the coefficient of friction between the ordinary vehicle tire and a drag strip surface.

The rollers 38 and 40 are independently rotatable about the axis 42 such that each vehicle may rotate the roller associated therewith at a rate which is determined by the performance characteristics of that vehicle. The rollers 38 and 40 are connected to load control means for placing a load or drag force on the rollers to resist rotation thereof and simulate the mass of the vehicles 22 and 24. In the single figure a load control unit 44 is shown mechanically connected to the spindle shaft of roller 40. It is to be understood that a similar load control unit is connected to roller 38. To most accurately simulate the mass or inertia effect of the vehicle 24, the load force imposed on the roller 40 by the unit 44 is preferably variable in accordance with the weight of the vehicle and the acceleration which is produced by the interaction between the rear wheels of the vehicle 24 and the surface of the roller 40. A suitable mechanism for controlling the weight and acceleration response characteristics is disclosed in the U.S. patent to Allen 2,979,942 issued Apr. 18, 1961. As a modification of the Allen device, the weight adjustment may be determined automatically by a spring suspension for the rollers 38 and 40 such that the operator of the vehicle need not know the weight of his vehicle.

The roller 40 is also connected through the output shaft thereof to a distance monitoring unit 46 which is adapted to produce signals representing the displacement of the roller 40 and is preferably calibrated to convert revolutions of the roller 40 to fractions of a quarter mile. The signals produced by the distance monitor unit 46 may be differentiated by circuitry known in the art to produce an acceleration signal if desired.

The output of the distance monitor unit 46 is connected to indicator means 48 for signaling the beginning and ending of the simulated race in which the vehicles 22 and 24 participate. Indicator means 48 includes a first progressively actuated signal means in the form of vertically arranged staging lights 50 and 52. The staging lights 50 and 52 are mounted on the forward wall 18 between the stalls A and B such that the staging lights 50 are principally directed toward stall A and the staging lights 52 are principally directed toward stall B. The lights 50 and 52 operate in synchronism to indicate the duration of a preparation period just prior to the actual beginning of a race. In other words, the uppermost light in each of the vertical arrangements 50 and 52 comes on first and each light in the vertical arrangements comes on in sequence to indicate the time remaining before the actual start of the race. The lights 50 and 52 may be different colors and may include a disqualification light should one or the other of the participants rotate his traction roller to begin the acceleration run before the actual "race begin" light turns on. A suitable clock operated stepper switch may be employed to control the lights 50 and 52. Those skilled in the art will recognize the vertical arrangements of lights 50 and 52 as the well-known "Christmas tree" found at and around drag strips.

Indicator means 48 comprises second progressively actuated signal means in the form of vertically arranged lights 54 and 56 to indicate the progress of the vehicles 22 and 24, respectively, during the race and further to indicate the end of the race. Lights 54 and 56 are independently operable such that lights 54 come on in sequence from top to bottom in accordance with the progress of vehicle 22 whereas lights 56 come on in sequence from top to bottom in accordance with the progress of vehicle 24. A cable 56 from the distance monitor unit 46 is preferably connected to the arrangement of lights 56 through a suitable accumulator such as a shift register and stepper switch responsive to the shift register to control the actuation of the lights 56. The ordinary race may be confined to a space of one-quarter of a mile or 1320 feet and the individual lights 54 and 56 may be taken to represent equal increments of distance over the quarter-mile.

The indicator means 48 also includes an illuminable signal 60 to indicate which of the vehicles 22 and 24 has won the race in accordance with which of the vehicles completes the simulated quarter-mile run first. A suitable gauging device to actuate one signal 60 in accordance with whichever vehicle fully illuminates the lights 54 and 56 first will be obvious to those skilled in the art. An additional signal 62 is provided to indicate the elapsed time for the quarter-mile run of the vehicle in the stall where the signal 62 appears. Finally, a signal 64 may be employed to indicate the maximum rate of speed reached by the vehicle in the stall where the signal appears.

The illusion of realism created within the structure 12 may be heightened by the use of projectors 66 which are directed toward screens 68 disposed on the front wall 18 of each of the stalls. The projector 66 may contain a continuous loop of film containing frames representing progressively varying scenes of an actual race. Such a film may be readily obtained by photographing the run of a vehicle over a drag strip at a desired rate of speed and calibrating the speed of the projector 66 to the expected time for the quarter-mile run of a vehicle using the apparatus as shown in the figure.

The assembly 10 is preferably coin-operated and includes a coin-receiving actuator 70 disposed on the guard rails 28 intermediate the vehicles 22 and 24. Coin-operated actuator means 70 adapted to receive a prescribed number of coins to actuate the projector 66, the staging lights 50 and 52 and to apply power to the load control unit 44 and the distance monitor unit 46 thereby to cause the entire assembly 10 to become operative. The coin operated actuator preferably includes coin-receipt slots on each lateral side thereof so that each driver may insert the proper number of coins and further such that a driver may engage in a solo race if he so desires. Separate coin-receiving slots may be provided for single and double vehicle races. Placing coins in the actuator 70 is also operative to extend a pair of forward motion restraining means 72 and 74. These means may include hydraulic actuators which extend the bumper portions thereof toward the vehicles until contact is made thereafter to prevent and restrain any forward motion of the vehicle toward the wall 18. Various other restraining devices may obviously be employed.

Although the operation of the assembly 10 is believed to be apparent from the foregoing description, a brief review of the operation thereof will now be made. The vehicles 22 and 24 enter the stalls A and B, respectively, and station themselves such that the rear drive wheels are in engagement with the traction rollers 38 and 40, respectively. The proper number of coins is inserted into the coin-actuated means 70 to begin the staging or preparation period. This is indicated by the illumination of the uppermost lights in the vertical arrangements 50 and 52. The projector 66 may also be started at that time along with the supply of power to the load control unit 44 and the distance monitor unit 46. The restraining means 72 and 74 are placed in position and the race is ready to begin. As the staging period progresses, the lights 50 and 52 are illuminated in sequence from top to bottom until a lower green light appears simultaneously to each of the vehicles 22 and 24. At this point, each of the drivers of the vehicles accelerates in accordance with the performance capabilities of his vehicle thus rotating the rear wheels and in turn rotating the traction rollers 38 and 40. Load control unit 44 applies a load or resistance force to the roller 40 which represents the inertia of the vehicle 24 and a similar resistance force or load is applied to the rollers 38 are previously described.

As the vehicle 24, for example, accelerates, the roller 40 rotates through a certain distance indicating the simulated travel of the vehicle 24 over a racing surface. Distance monitor unit 46 generates signals which may, for example, be digital signals produced by aiming a light source through a spoked wheel or blade which rotates in synchronism with the traction roller 40. The light pulses may be converted to electrical signals by means of a conventional photocell and the electrical signals applied to an accumulator such as a shift register. These digital signals are applied to the vertically arranged lights 54 and 56 and the indicator means 48 to indicate the progress of each of the vehicles through the simulated race course. Assuming the vehicle 24 reaches the simulated end of the race course first, the lowermost light in the vertical arrangement of lights 56 comes on simultaneously illuminating signal 60 in stall B and preventing the illumination of the corresponding signal 60 in stall A to indicate the vehicle 24 as the winner of the race. A small computer may be employed to calculate and display the elapsed time and maximum speed of vehicle 24 by way of the signals 62 and 64.

During the running of the race the projector 66 displays on screen 68 a racing scene which causes the driver of the vehicle 24 to believe he is actually participating in the drag race.

At the conclusion of the race the apparatus is returned to an initial state and the restraining means 72 and 74 are withdrawn. At this time the vehicles 22 and 24 may be backed out of the racing stalls A and B and another pair of vehicles may take their place. Of course, the assembly 10 may be employed in an "eliminator" fashion wherein the winning vehicle remains to race again whereas the losing vehicle must give way to another contestant. Various other manners and ways of using the assembly 10 will occur to those skilled in the art.

It is to be understood that the foregoing description of an illustrative embodiment is not exhaustive of the implementations which are possible in accordance with the invention and are, therefore, not to be construed in a limiting sense.

The embodiments of the invention in which an exclusive property or privilege is claimed are defined as follows:

1. A vehicle race simulation assembly comprising: means defining an enclosing structure for a vehicle; a support surface within the structure and having at least one opening, rotatable traction means having a traction surface within the opening for engagement with the drive wheels of the vehicle; and indicator means operatively connected with the traction means for signalling the beginning and ending of a simulated race participated in by the vehicle.

2. An assembly as defined in claim 1 wherein the indicator means includes first progressively actuated signal means for indicating the duration of a preparation period prior to the beginning of the simulated race.

3. An assembly as defined in claim 2 including coin-operated means for starting the first progressively actuated signal means.

4. An assembly as defined in claim 2 wherein the first progressively actuated signal means includes a vertically arranged plurality of lights.

5. An assembly as defined in claim 1 including means within the structure for restraining forward motion of the vehicle.

6. An assembly as defined in claim 1 wherein the indicator means includes second progressively actuated signal means for indicating the accumulated distance traveled by the vehicle during the simulated race.

7. An assembly as defined in claim 6 wherein the second progressively actuated signal means includes a vertically arranged plurality of lights.

8. An assembly as defined in claim 1 wherein the structure includes a forward wall facing the vehicle in the structure and means for projecting a raceway scene on the wall.

9. A vehicle racing simulation assembly comprising: means defining a pair of laterally adjacent parallel vehicle stalls; a support surface in each of the stalls and having an opening therein; rotatable traction means disposed in the opending in each of the stalls and having traction surfaces engageable by the drive wheels of the vehicles in the stalls; and indicator means operatively connected to the traction means for signaling the beginning and ending of a simulated race between the vehicles in the stalls.

10. An assembly as defined in claim 9 wherein the indicator means includes first progressively actuated signal means for indicating the duration of a preparation period prior to the beginning of the simulated race.

11. An assembly as defined in claim 10 wherein the progressively actuated signal means includes a vertically arranged plurality of lights disposed between the stalls.

12. An asembly as defined in claim 9 including coin-operated means in the stalls for initiating operation of the signal means.

13. An assembly as defined in claim 9 including means within each of the stalls for restraining forward motion of the vehicles.

14. An assembly as defined in claim 9 wherein the indicator means includes second progressively actuated signal means for indicating the accumulated distance traveled by each of the vehicles.

15. An assembly as defined in claim 14 wherein the indicator means includes two laterally adjacent vertical arrangements of lights, each indicating the distance traveled by a vehicle.

16. An assemby as defined in claim 15 including means for indicating the winner of the race.

17. An assembly as defined in claim 16 including means defining a forward wall in each of the stalls, and means for projecting a racing scene on each of the walls.

18. An assembly as defined in claim 9 including side walls and a ceiling enclosing the stalls, and acoustical absorption means on the walls and ceiling.

References Cited

UNITED STATES PATENTS

| | | | |
|---|---|---|---|
| 2,148,828 | 2/1939 | Myers | 194—9 |
| 2,521,322 | 9/1950 | Baadte | 73—114 |
| 2,631,041 | 3/1953 | Zaichick | 273—86(R) |
| 2,749,747 | 6/1956 | Cline | 73—117 |
| 2,979,942 | 4/1961 | Allen | 73—117 |
| 3,410,223 | 11/1968 | Miller | 104—60 |

ARTHUR L. LA POINT, Primary Examiner

H. BELTRAN, Assistant Examiner

U.S. Cl. X.R.

73—117; 74—14; 104—60; 180—82; 194—1, 9; 272—17; 340—52